United States Patent
Lundgren et al.

(10) Patent No.: US 9,204,044 B2
(45) Date of Patent: Dec. 1, 2015

(54) METHOD AND APPARATUS FOR OPTIMIZATION DURING CAMERA FLASH PULSES

(71) Applicant: Nokia Corporation, Espoo (FI)

(72) Inventors: Mika-Petteri Kristian Lundgren, Salo (FI); Juha Petteri Kuusisto, Salo (FI); Tino Tapani Hellberg, Littoinen (FI)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 14/044,436

(22) Filed: Oct. 2, 2013

(65) Prior Publication Data

US 2015/0092103 A1    Apr. 2, 2015

(51) Int. Cl.
*H04N 5/222* (2006.01)
*H04N 5/225* (2006.01)
*H04N 5/232* (2006.01)
*H04N 5/235* (2006.01)

(52) U.S. Cl.
CPC ......... *H04N 5/23241* (2013.01); *H04N 5/2256* (2013.01); *H04N 5/2354* (2013.01)

(58) Field of Classification Search
CPC ...... G03B 2215/05; G03B 9/70; G03B 15/04; G03B 15/085; G03B 7/16; G03B 2217/007; G03B 7/26; G03B 15/05; H04N 5/3698; H04N 5/23293
USPC .......................... 348/371, 372, 333.01–333.13
See application file for complete search history.

(56) References Cited

U.S. PATENT DOCUMENTS

| | | | | |
|---|---|---|---|---|
| 3,917,975 A | * | 11/1975 | Birkner | 315/200 R |
| 4,999,663 A | * | 3/1991 | Nakamura | 396/89 |
| 5,097,340 A | * | 3/1992 | Tanabe et al. | 348/371 |
| 5,815,205 A | * | 9/1998 | Hashimoto et al. | 348/373 |
| 5,963,255 A | | 10/1999 | Anderson et al. | |
| 6,628,336 B2 | * | 9/2003 | Hamamura | 348/371 |
| 6,710,809 B1 | * | 3/2004 | Niikawa | 348/372 |
| 7,102,685 B2 | * | 9/2006 | Nishimura | 348/372 |
| 7,915,835 B2 | * | 3/2011 | Takenaka | 315/241 P |
| 8,120,699 B2 | * | 2/2012 | Miyata | 348/371 |
| 8,184,969 B2 | | 5/2012 | Guthrie et al. | |
| 8,922,708 B2 | * | 12/2014 | Kalevo et al. | 348/372 |
| 2002/0008773 A1 | * | 1/2002 | Akizuki et al. | 348/371 |
| 2002/0064384 A1 | * | 5/2002 | Kawasaki et al. | 396/157 |
| 2003/0011704 A1 | | 1/2003 | Sawachi | |
| 2003/0043273 A1 | * | 3/2003 | Suzuki | 348/207.2 |
| 2003/0147003 A1 | * | 8/2003 | Kawase | 348/371 |
| 2004/0012712 A1 | * | 1/2004 | Kawakami | 348/372 |
| 2004/0027480 A1 | * | 2/2004 | Hamamura | 348/371 |
| 2004/0070683 A1 | * | 4/2004 | Thorland et al. | 348/371 |
| 2005/0063119 A1 | * | 3/2005 | Dowe et al. | 361/92 |
| 2007/0076117 A1 | * | 4/2007 | Kawase | 348/370 |
| 2007/0146529 A1 | * | 6/2007 | Suzuki | 348/333.01 |
| 2008/0024632 A1 | * | 1/2008 | Otsuka | 348/294 |

(Continued)

OTHER PUBLICATIONS

Extended European Search Report received for corresponding European Patent Application No. 14186156.7, dated Feb. 2, 2015, 6 pages.

*Primary Examiner* — Chia-Wei A Chen (74) *Attorney, Agent, or Firm* — Nokia Technologies Oy (57) ABSTRACT

Disclosed herein is an apparatus. The apparatus includes a camera, a camera flash, and a current optimization system. The current optimization system is connected to the camera and the camera flash. The current optimization system is configured to calculate a shutdown period based on a flash mode of the camera.

17 Claims, 7 Drawing Sheets

(56) References Cited

U.S. PATENT DOCUMENTS

| | | | |
|---|---|---|---|
| 2008/0284874 A1* | 11/2008 | Odaka | 348/229.1 |
| 2010/0013956 A1* | 1/2010 | Furuya et al. | 348/229.1 |
| 2010/0165181 A1* | 7/2010 | Murakami et al. | 348/371 |
| 2011/0115971 A1* | 5/2011 | Furuya et al. | 348/371 |
| 2011/0128436 A1* | 6/2011 | Ohsuga et al. | 348/371 |
| 2012/0177352 A1* | 7/2012 | Pillman et al. | 396/61 |
| 2012/0188426 A1* | 7/2012 | Tsai | 348/297 |
| 2012/0262592 A1 | 10/2012 | Rabii | |

\* cited by examiner

METHOD AND APPARATUS FOR OPTIMIZATION DURING CAMERA FLASH PULSES

TECHNICAL FIELD

The invention relates to an electronic device and, more particularly, to peak current optimization during camera flash pulses.

BACKGROUND

As electronic devices continue to become more sophisticated, these devices provide an increasing amount of functionality and features. Many electronic devices continue to have more and more powerful camera flash modules that cause significant current spikes when taking pictures. As consumers demand increased functionality from electronic devices, there is a need to provide improved devices having increased capabilities while maintaining robust and reliable product configurations.

SUMMARY

Various aspects of examples of the invention are set out in the claims.

In accordance with one aspect of the invention, an apparatus is disclosed. The apparatus includes a camera, a camera flash, and a current optimization system. The current optimization system is connected to the camera and the camera flash. The current optimization system is configured to calculate a shutdown period based on a flash mode of the camera.

In accordance with another aspect of the invention, a method is disclosed.

A command is received from a camera of a device. Predefined peripherals/functionalities of the device are attenuated. An amount of time the predefined peripherals/functionalities are attenuated is calculated based on a flash mode of the camera.

In accordance with another aspect of the invention, a computer program product is disclosed. The computer program product includes a computer-readable medium bearing computer program code embodied therein for use with a computer. The computer program code includes code for receiving a command from a camera of a device. Code for attenuating predefined peripherals/functionalities of the device. Code for calculating an amount of time the predefined peripherals/functionalities are attenuated based on a flash mode of the camera.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Figure 1:
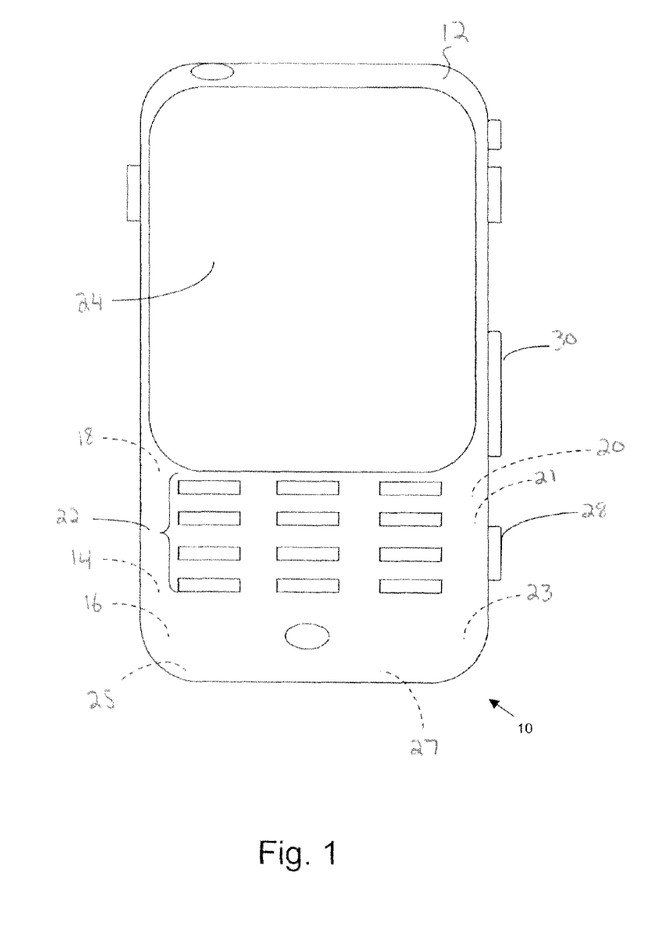
FIG. 1 is a front view of an electronic device incorporating features of the invention.

Referring to FIG. 1, there is shown a front view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a mobile phone, a gaming device, a music player, a notebook computer, or a personal digital assistant, for example. In addition, as is known in the art, the device 10 can include multiple features or applications such as a camera, a music player, a game player, or an Internet browser, for example. The device 10 generally comprises a housing 12, a transmitter 14, a receiver 16, an antenna 18 (connected to the transmitter 14 and the receiver 16), electronic circuitry 20, such as a controller (which could include a processor [or central processing unit (CPU)], for example) 21 and a memory 23 for example, within the housing 12, a user input region 22 and a display 24 (which could include a graphics processing unit [GPU] 25, for example). It should be understood that although the user input region 22 is illustrated as a keypad, various exemplary embodiments of the invention may include touch-screen technology at the user input region 22. The display 24 could also form a user input section, such as a touch screen. It should be noted that in alternate embodiments, the device 10 can have any suitable type of features as known in the art. Additionally, all of these components within the device 10 are normally powered by a portable power supply such as a battery 27.

Figure 2:
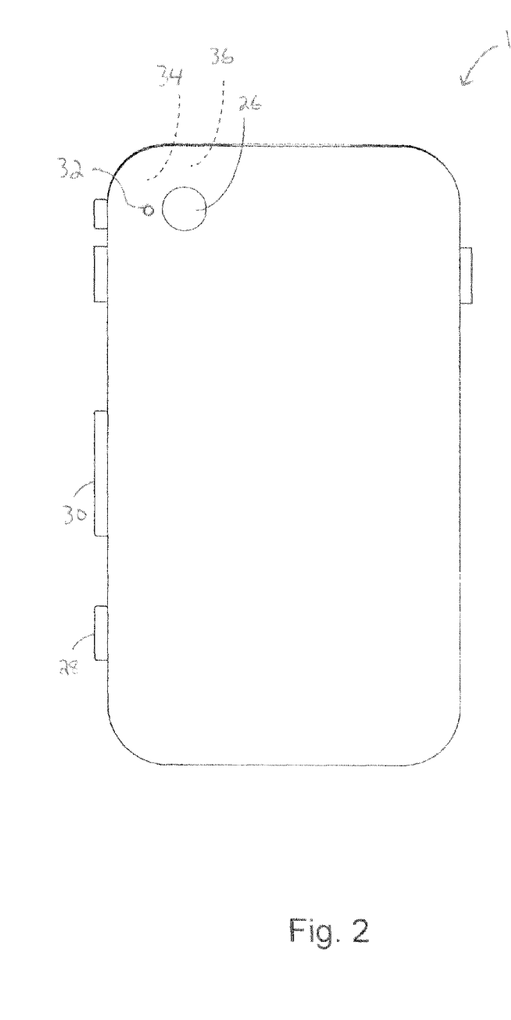
FIG. 2 is a rear view of the electronic device shown in FIG. 1.

Referring now also to FIG. 2, the electronic device 10 further comprises a camera 26 which is shown as being rearward facing (for example for capturing images and/or video for local storage) but may alternatively or additionally be forward facing (for example for video calls). The camera 26 may be controlled by a shutter actuator 28 and optionally by a zoom actuator 30. However, any suitable camera control functions and/or camera user inputs may be provided.

The electronic device 10 further comprises a camera flash 32 and a current optimization system 34. The camera flash generally provides one flash sequence (single photo capture) which may include one or two pre-flash pulses and one main-flash pulse. According to some embodiments of the invention, if the first pre-flash pulse is satisfactory, then no second pre-flash pulse is generally provided. Additionally, in some embodiments of the invention, a flash driver 36 includes safety features that allow up to six consecutive photos to be taken (six flash sequences in a row) and forces 3-4 s delay after that (exact delay is generally product dependent). Furthermore, a delay between the flash sequences may be determined by camera, ISP (Image Signal processor [which generally handles image processing]), image processing algorithms (which may include algorithms implemented in the image processing chain, for example), apps, and so forth. Although some embodiments of the invention have been described in context of flash LEDs, it should be understood that camera flash 32 may be implemented by various other flash technologies such as a xenon flash.

Figure 3:
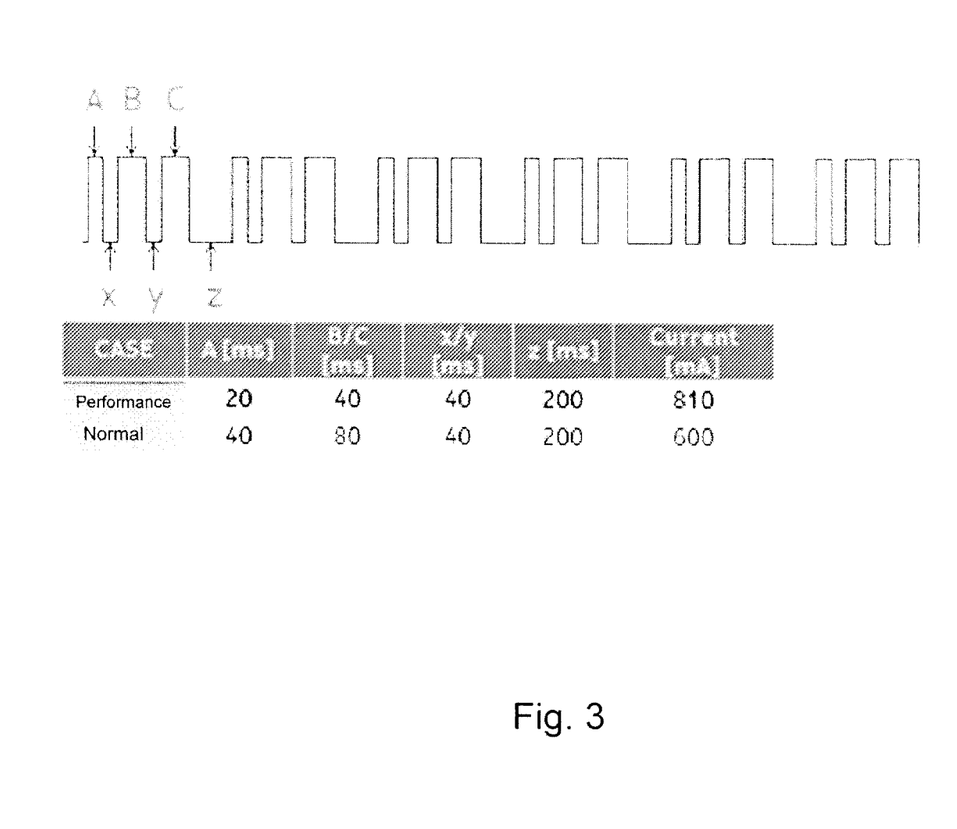
FIG. 3 is a representation illustrating flash timing schemes of the electronic device shown in FIG. 1.

According to various exemplary embodiments of the invention, different flash modes may be provided. For example, in some embodiments of the invention, a 'performance' flash mode and a 'normal' flash mode may be provided. In some embodiments of the invention, the image processing algorithm(s) provides a decision whether the performance or normal flash mode is used based on photo shooting circumstances. Referring now also to FIG. 3, timing schemes of the performance and normal mode flash sequences with two pre-flash pulses are shown. As shown in FIG. 3, parameter z (delay between the flash sequences) may not be constant.

Figure 4:
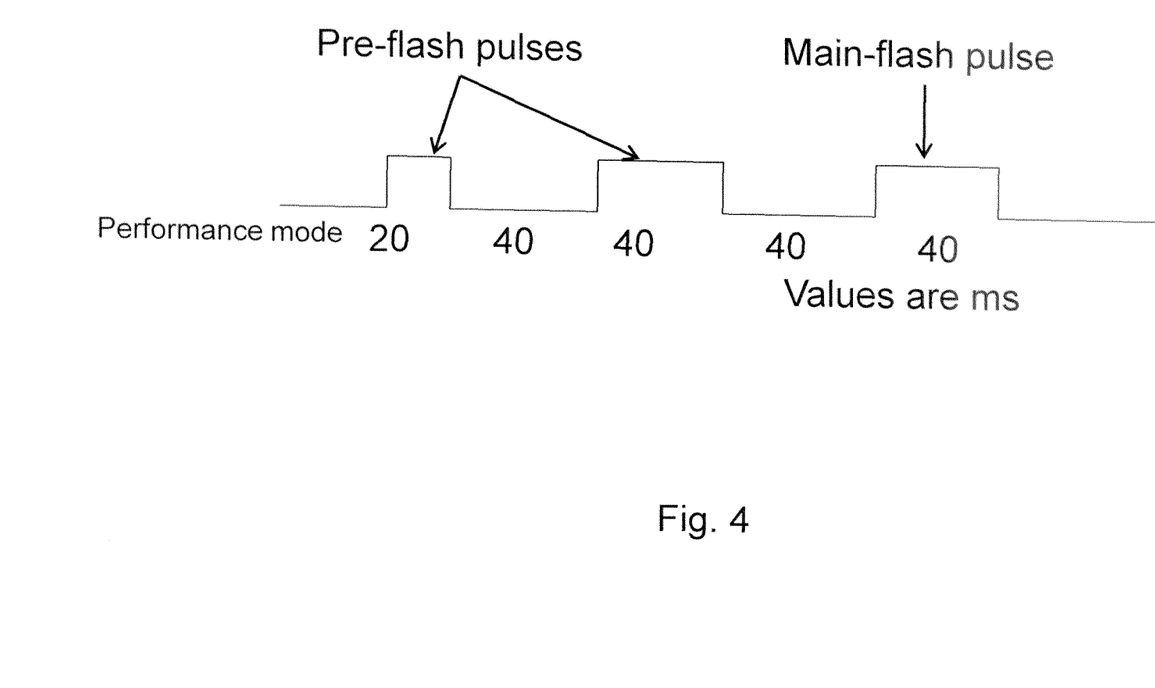
FIG. 4 is a representation illustrating a performance mode flash timing scheme of the electronic device shown in FIG. 1.

Referring now also to FIG. 4, a timing scheme of the performance mode flash sequence with two pre-flash pulses is shown. Performance mode generally uses shorter pulse lengths but higher currents compared to the normal mode if battery voltage (VBAT) is within suitable limits such as VBAT≥3.7V (Flash driver A+Flash LED A case), or VBAT≥3.6V (Flash driver A+Flash LED B case). According to various embodiments, if the battery voltage is within limits, the flash driver supplies 810 mA current into dual series light emitting diodes (LED) (Flash driver A+Flash LED A/Flash LED B). If the battery voltage is not within limits, the flash driver supplies about 600 mA current into dual series LEDs (Flash driver A+Flash LED A/Flash LED B).

Figure 5:
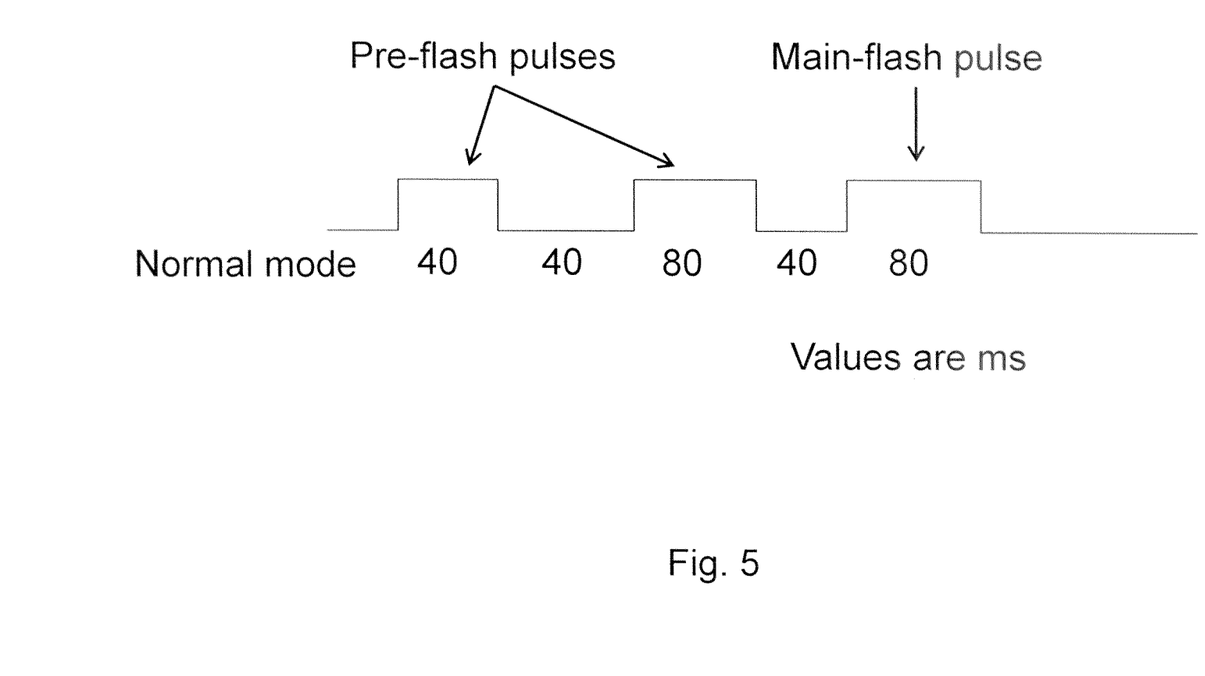
FIG. 5 is a representation illustrating a normal mode flash timing scheme of the electronic device shown in FIG. 1.

Referring now also to FIG. 5, a timing scheme of the normal mode flash sequence with two pre-flash pulses is shown. Normal mode generally uses longer pulse lengths but lower currents compared to performance mode. According to various embodiments, normal mode is not battery voltage dependent and can be used with the lower battery voltages than the performance mode. In the normal mode, the flash driver generally supplies about 600 mA current into dual series LEDs (Flash driver A+Flash LED A/Flash LED B).

According to various exemplary embodiments of the invention, the current optimization system 34 is configured to reduce current consumption from parts of the device when the camera flash light is illuminated. For example, in some embodiments, a target is to reduce battery voltage drop and give more current to flash light with low battery voltages. Additionally, in some embodiments device software (SW) can calculate a length of the time period when the flash mode is known, and shutdown/reduce current consumption of parts (or features) of the device (or system) without user experience reduction. For example, some parts (or features) that can be used to reduce current consumption may include: a display backlight which can be shut down/dimmed (which may be provided as a "shutter" feature), organic light emitting diode (OLED) display pixels can be turned to black (which may be provided as a "shutter" feature), GPU and CPU clock/power mitigation, IHF speaker attenuation by few dB (such as where users cannot hear a few dB attenuation during a such short period of time), and/or a vibra motor can be blocked. However, it should be noted these are provided non-limiting examples, and in alternate embodiments, any suitable parts or features of the device may be used to reduce current consumption.

The current optimization system comprises a (software) framework for controlling high current HW component(s) and SW drivers. Usage of short but high current pulse can be requested from the framework. Framework then can accept or deny the request based on device power state, and if OK, it will make the needed controlling based on timing information from the requester.

Camera SW calculates and determines how long flash pulses are going to last based on flash mode and number of flash pulses to be shot. This information is passed to the framework which then knows when to start peak current optimization and when it can be stopped.

Figure 6:
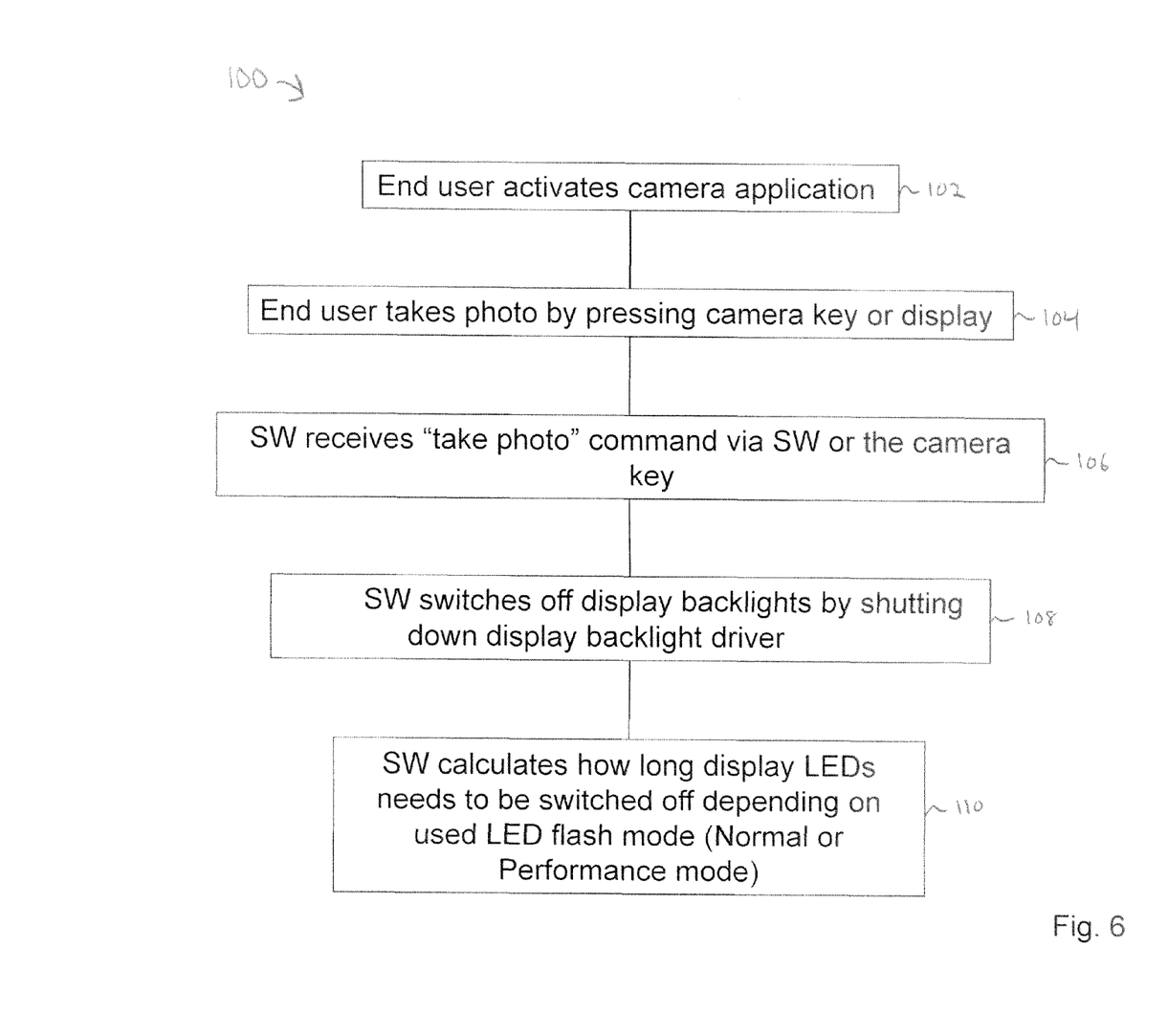
FIG. 6 is an exemplary method of the device shown in FIG. 1.

FIG. 6 illustrates a method 100. The method 100 includes the end user activating a camera application of the device (at block 102). The end user takes a photo by pressing camera key or display (at block 104), wherein with a camera key, a half press adjusts focus, and with a display solution, after display is pressed, focus is adjusted automatically. The current optimization system (which includes software [SW] and/or the software framework) receives "take photo" command via SW or the camera key (at block 106). The current optimization system (which includes software [SW] and/or the software framework) switches off display backlights by shutting down display backlight driver (at block 108). The current optimization system (which includes software [SW] and/or the software framework) calculates how long display backlights, such as for example light emitting diodes (LEDs), need to be switched off depending on used LED flash mode (normal or performance mode) (at block 110). It should be noted that the illustration of a particular order of the blocks does not necessarily imply that there is a required or preferred order for the blocks and the order and arrangement of the blocks may be varied. Furthermore it may be possible for some blocks to be omitted.

For example, in performance mode the display backlights can be switched off about 180 ms+some margin+SW/HW delay to make sure display backlights are not illuminated too early (as shown in FIG. 4). And in normal mode the display backlights can be switched off about 280 ms+some margin+ SW/HW delay to make sure display backlights are not illuminated too early (as shown in FIG. 5).

Further to the method 100, after the display backlights are switched off, the photo is taken, and then the display backlights are switched on after photo is taken. According to various exemplary embodiments, switching the display backlights on/off takes about 1 ms. Additionally in some embodiments, a display backlight driver includes a HW based dimming feature which slows down backlight on/off switching times a bit. However in alternate embodiments, any suitable configuration may be provided.

While various exemplary embodiments of the invention have been described in connection with switching off the display backlights, one skilled in the art will appreciate that the various exemplary embodiments of the invention are not necessarily so limited and that in alternate embodiments, any suitable display or other components of the system can be at least partly shutdown to reduce power consumption in the device during camera flash operation (wherein the length of the shutdown period is calculated based on current flash mode of the system).

Figure 7:
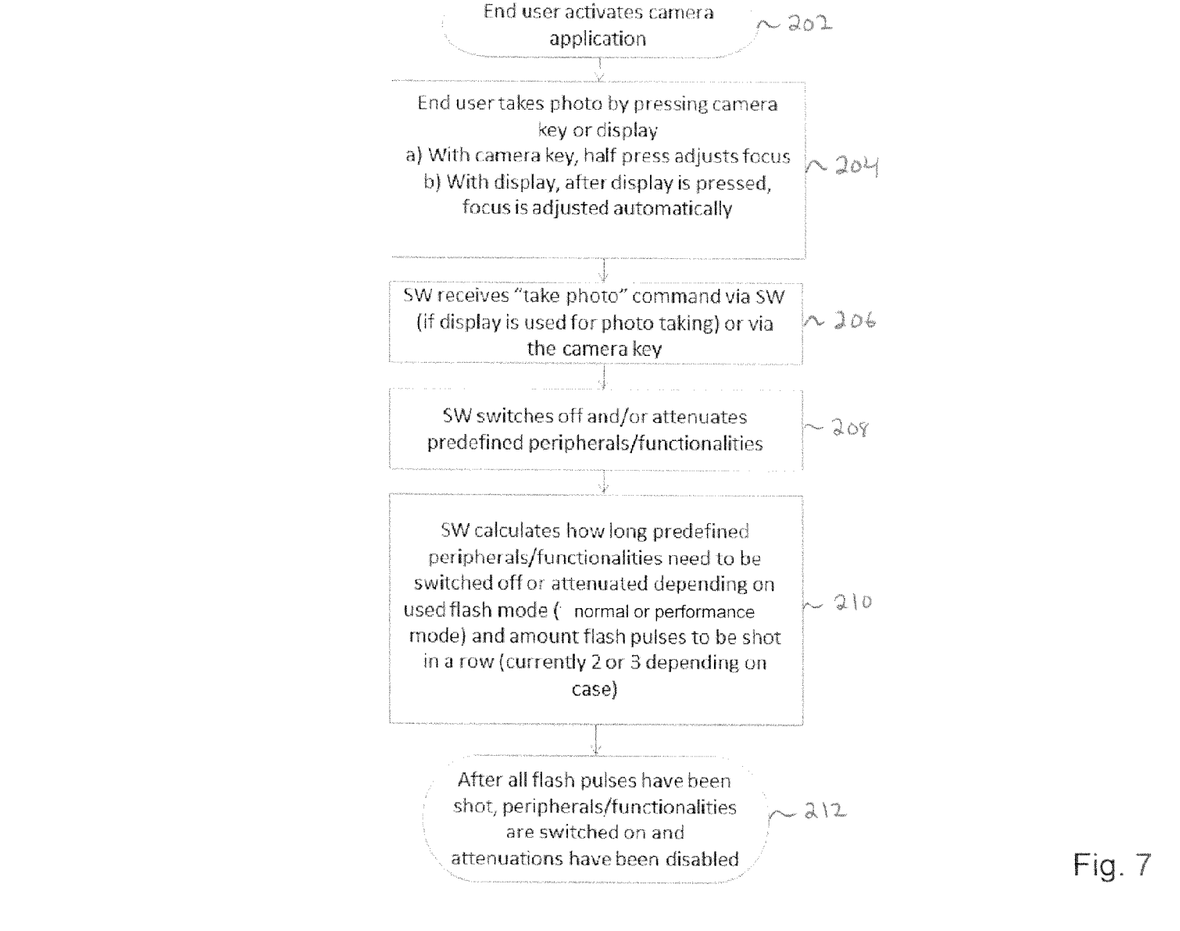
FIG. 7 is another exemplary method of the device shown in FIG. 1.

For example, FIG. 7 illustrates another exemplary method 200. Similar to the method 100, the method 200 illustrates the behavior of the SW controlled current consumption optimization during camera flash pulses. The method 200 includes the end user activating a camera application of the device (at block 202). The end user takes a photo by pressing camera key or display, wherein with a camera key, a half press adjusts focus, and with a display solution, after display is pressed, focus is adjusted automatically (at block 204). The current optimization system (which includes software [SW] and/or the software framework) receives "take photo" command via SW (if the display is used for photo taking) or via the camera key (at block 206). The current optimization system (which includes software [SW] and/or the software framework) switches off and/or attenuates predefined peripherals/functionalities (at block 208). The current optimization system (which includes software [SW] and/or the software framework) calculates how long predefined peripherals/functionalities need to be switched off or attenuated depending on the used flash mode (for example: normal or performance mode) and/or amount of flash pulses to be shot in a row (which may be two or three, for example, depending on the case) (at block 210). After all flash pulses have been shot, peripherals/functionalities are switched on and attenuations have been disabled (at block 212). It should be noted that the illustration of a particular order of the blocks does not necessarily imply that there is a required or preferred order for the blocks and the order and arrangement of the blocks may be varied. Furthermore it may be possible for some blocks to be omitted.

Figure 8:
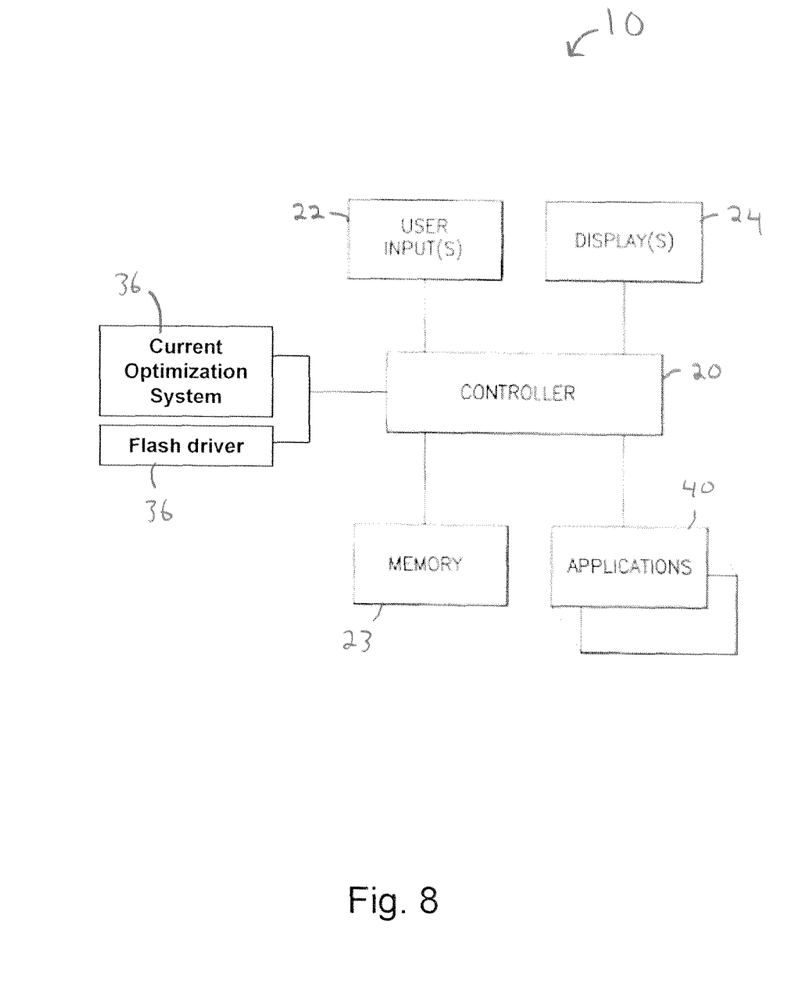
FIG. 8 is a schematic drawing illustrating components of the electronic device shown in FIG. 1.

Referring now also to FIG. 8, the device 10 generally comprises the controller 20 such as a microprocessor for example. The electronic circuitry includes the memory 23 coupled to the controller 20, such as on a printed circuit board for example. The memory could include multiple memories including removable memory modules for example. The device has applications 40, such as software, which the user can use. The applications can include, for example, a telephone application, an Internet browsing application, a game playing application, a digital camera application, a map/gps application, etc. These are only some examples and should not be considered as limiting. One or more user inputs 22 are coupled to the controller 20 and one or more displays 24 are coupled to the controller 20. The Current Optimization System 34 and the Flash driver 36 are also coupled to the controller 20 (wherein the Current Optimization System 34 may be software framework running on the controller 20, for example). The camera 26 (and camera flash 32) is also connected to the Current Optimization System 34 and/or the Flash driver 36. The device 10 is programmed to automatically attenuate and/or switch off the predefined peripherals based on the SW controlled current consumption optimization during camera flash pulses.

Technical effects of any one or more of the exemplary embodiments provide various improvements when compared to conventional configurations which cause the battery voltage to drop when using a flash (due to current peaks when taking a picture with the camera flash). For example many conventional handsets have powerful camera flash modules that cause significant current spikes when taking pictures. Current spikes cause battery voltage to drop. If battery voltage drops too low (under cut-off limits), the handset will turn off. Some solutions prevent battery voltage to drop under cut-off limits by reducing camera flash current when battery voltage is under predefined level. However, reducing camera flash current means lower light intensity and longer flash pulses that will degrade picture quality and sharpness of movement. Some other configurations show a shutter animation when photo is taken, and further some other configurations do not allow the use of the flash at all when battery voltage is too low. Additionally, it is likely that Flash LED(s) current(s) will continue to increase in the near future. Thus, increased currents can cause issues with nominal or lower battery voltages because high current pulses will drop battery voltage close to cut-off limits. If too much current is drawn with nominal or lower battery voltages, devices may shutdown when battery voltage drops too much.

Without in any way limiting the scope, interpretation, or application of the claims appearing below, a technical effect of one or more of the example embodiments disclosed herein is providing a SW controlled peak current optimization during camera flash pulses. Another technical effect of one or more of the example embodiments disclosed herein is to calculate the shutdown period from a current flash mode of the system. Another technical effect of one or more of the example embodiments disclosed herein is determining the length of the power saving period based on the current flash mode of the system. Another technical effect of one or more of the example embodiments disclosed herein is that instead of performance decrease with lower battery voltages, certain short term functionalities can be executed with full performance, for example getting the best camera picture quality always, if this is wanted to be prioritized. On the other hand, if prioritized, this can also be used to avoid battery voltage dropping under cut-off limits by limiting peak currents.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Embodiments of the present invention may be implemented in software, hardware, application logic or a combination of software, hardware and application logic. The software, application logic and/or hardware may reside on the electronic device 10 (such as on the memory 23, or another memory of the device), on a server, or any other suitable location. If desired, part of the software, application logic and/or hardware may reside on device, and part of the software, application logic and/or hardware may reside on the server. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 1, 2, and 8. A computer-readable medium may comprise a computer-readable storage medium that may be any non-transitory media or means that can contain or store the instructions for use by or in connection with an instruction execution system, apparatus, or device, such as a computer.

Below are provided further descriptions of various non-limiting, exemplary embodiments. The below-described exemplary embodiments are may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, an apparatus, comprising a camera, a camera flash, and a current optimization system connected to the camera and the camera flash, wherein the current optimization system is configured to calculate a shutdown period based on a flash mode of the camera.

An apparatus as above, wherein the current optimization system is configured to at least partly shutdown a component of the apparatus to reduce power consumption in the apparatus during camera flash operation, wherein the length of the shutdown period is calculated based on the flash mode of the camera.

An apparatus as above, wherein the camera comprises a first flash mode and a second different flash mode, and wherein the current optimization system is configured to calculate the length of the shutdown period based on a selected flash mode of the camera.

An apparatus as above, wherein the current optimization system is configured to at least partly shutdown at least one of a display backlight, a display pixel, a graphics/central processing unit clock, an integrated hands free speaker, or a vibra motor of the apparatus to reduce power consumption in the apparatus during camera flash operation.

An apparatus as above, wherein the current optimization system is configured to switch off display backlight of the apparatus to reduce power consumption in the apparatus during camera flash operation, wherein the length of the shutdown period is calculated based on the flash mode of the system.

An apparatus as above, wherein the current optimization system is configured to switch off display backlights by shutting down a display backlight driver of the apparatus to reduce power consumption in the apparatus.

An apparatus as above, wherein the current optimization system is configured to switch on the display backlight after flash pulses have been shot.

An apparatus as above, wherein the apparatus comprises a mobile phone.

In another exemplary embodiment a method, comprising: receiving a command from a camera of a device; attenuating predefined peripherals/functionalities of the device; and calculating an amount of time the predefined peripherals/functionalities are attenuated based on a flash mode of the camera.

A method as above, wherein the attenuating further comprises switching off the predefined peripherals/functionalities of the device.

A method as above, wherein the predefined peripherals/functionalities comprises at least one of a display backlight, a display pixel, a graphics/central processing unit clock, an integrated hands free speaker, or a vibra motor of the device.

A method as above, wherein the camera comprises a first flash mode and a second different flash mode, wherein a current optimization system of the device is configured to calculate the amount of time the predefined peripherals/functionalities are attenuated based on a selected flash mode of the camera.

A method as above, further comprising disabling the attenuations after flash pulses of a camera flash have been shot.

A method as above, wherein the receiving of the command from the camera of the device further comprises receiving a 'take photo' command from the camera of the device.

In another exemplary embodiment a computer program product comprising a computer-readable medium bearing computer program code embodied therein for use with a computer, the computer program code comprising: code for receiving a command from a camera of a device; code for attenuating predefined peripherals/functionalities of the device; and code for calculating an amount of time the predefined peripherals/functionalities are attenuated based on a flash mode of the camera.

A computer program product as above, wherein the code for attenuating further comprises code for switching off the predefined peripherals/functionalities of the device.

A computer program product as above, wherein the predefined peripherals/functionalities comprises at least one of a display backlight, a display pixel, a graphics/central processing unit clock, an integrated hands free speaker, or a vibra motor of the device.

A computer program product as above, wherein the camera comprises a first flash mode and a second different flash mode, wherein a current optimization system of the device is configured to calculate the amount of time the predefined peripherals/functionalities are attenuated based on a selected flash mode of the camera.

A computer program product as above, further comprising code for disabling the attenuations after flash pulses of a camera flash have been shot.

A computer program product as above, wherein the code for receiving the command from the camera of the device further comprises code for receiving a 'take photo' command from the camera of the device.

In another exemplary embodiment, an apparatus comprises a camera; means for attenuating predefined peripherals/functionalities of the apparatus; and means for calculating an amount of time the predefined peripherals/functionalities are attenuated based on a flash mode of the camera.

In another exemplary embodiment, the camera comprises a first flash mode and a second different flash mode, wherein means for calculating of the apparatus is configured to calculate the amount of time the predefined peripherals/functionalities are attenuated based on a selected flash mode of the camera.

In another exemplary embodiment, the predefined peripherals/functionalities comprises at least one of a display backlight, a display pixel, a graphics/central processing unit clock, an integrated hands free speaker, or a vibra motor of the apparatus.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus, comprising:
a camera;
a camera flash; and
a current optimization system connected to the camera and the camera flash, wherein the camera comprises a first flash mode and a second flash mode and the current optimization system is configured to calculate a shutdown period based on a selected flash mode of the camera, and wherein the first and second flash modes comprise one or more pre-flash pulses and a main flash pulse and the shutdown period is calculated based on a number of flash pulses.

2. The apparatus of claim 1 wherein the current optimization system is configured to at least partly shutdown a component of the apparatus to reduce power consumption in the apparatus during camera flash operation, wherein the length of the shutdown period is calculated based on the flash mode of the camera.

3. The apparatus of claim 2 wherein the current optimization system is configured to at least partly shutdown at least one of a display backlight, a display pixel, a graphics/central processing unit clock, an integrated hands free speaker, or a vibra motor of the apparatus to reduce power consumption in the apparatus during camera flash operation.

4. The apparatus of claim 1 wherein the current optimization system is configured to switch off display backlight of the apparatus to reduce power consumption in the apparatus during camera flash operation, wherein the length of the shutdown period is calculated based on the flash mode of the system.

5. The apparatus of claim 4 wherein the current optimization system is configured to switch off display backlights by shutting down a display backlight driver of the apparatus to reduce power consumption in the apparatus.

6. The apparatus of claim 4 wherein the current optimization system is configured to switch on the display backlight after flash pulses have been shot.

7. The apparatus of claim 1 wherein the apparatus comprises a mobile phone.

8. A method, comprising:
receiving a command from a camera of a device;
attenuating predefined peripherals/functionalities of the device; and
calculating an amount of time the predefined peripherals/functionalities are attenuated based on a flash mode of the camera, wherein the camera comprises a first flash mode and a second flash mode, the first and second flash modes comprising one or more pre-flash pulses and a main flash pulse, and wherein the amount of time the predefined peripherals/functionalities are attenuated is calculated based on a number of flash pulses.

9. The method of claim 8 wherein the attenuating further comprises switching off the predefined peripherals/functionalities of the device.

10. The method of claim 8 wherein the predefined peripherals/functionalities comprises at least one of a display backlight, a display pixel, a graphics/central processing unit clock, an integrated hands free speaker, or a vibra motor of the device.

11. The method of claim 8 further comprising disabling the attenuations after flash pulses of a camera flash have been shot.

12. The method of claim 8 wherein the receiving of the command from the camera of the device further comprises receiving a 'take photo' command from the camera of the device.

13. A computer program product comprising a non-transitory computer-readable medium bearing computer program code embodied therein for use with a computer, the computer program code comprising:
code for receiving a command from a camera of a device;
code for attenuating predefined peripherals/functionalities of the device; and
code for calculating an amount of time the predefined peripherals/functionalities are attenuated based on a flash mode of the camera, wherein the camera comprises a first flash mode and a second flash mode, the first and second flash modes comprising one or more pre-flash pulses and a main flash pulse, and wherein the amount of time the predefined peripherals/functionalities are attenuated is calculated based on a number of flash pulses.

14. The computer program product of claim 13 wherein the code for attenuating further comprises code for switching off the predefined peripherals/functionalities of the device.

15. The computer program product of claim 13 wherein the predefined peripherals/functionalities comprises at least one of a display backlight, a display pixel, a graphics/central processing unit clock, an integrated hands free speaker, or a vibra motor of the device.

16. The computer program product of claim 13 further comprising code for disabling the attenuations after flash pulses of a camera flash have been shot.

17. The computer program product of claim 13 wherein the code for receiving the command from the camera of the device further comprises code for receiving a 'take photo' command from the camera of the device.

* * * * *